(12) United States Patent
Ohara

(10) Patent No.: US 11,040,657 B2
(45) Date of Patent: Jun. 22, 2021

(54) VEHICLE CONTROL SYSTEM AND VEHICLE CONTROL DEVICE

(71) Applicant: Hideyuki Ohara, Kyoto-fu (JP)

(72) Inventor: Hideyuki Ohara, Kyoto-fu (JP)

(73) Assignee: NIDEC MOBILITY CORPORATION, Aichi (JP)

( * ) Notice: Subject to any disclaimer, the term of this patent is extended or adjusted under 35 U.S.C. 154(b) by 8 days.

(21) Appl. No.: 16/816,357

(22) Filed: Mar. 12, 2020

(65) Prior Publication Data

US 2020/0290510 A1 Sep. 17, 2020

(30) Foreign Application Priority Data

Mar. 13, 2019 (JP) .............................. JP2019-046335

(51) Int. Cl.
| | | |
|---|---|---|
| *B60Q 9/00* | (2006.01) | |
| *B60W 40/08* | (2012.01) | |
| *H04W 4/40* | (2018.01) | |
| *G08B 21/02* | (2006.01) | |
| *B60R 11/04* | (2006.01) | |

(52) U.S. Cl.
CPC ............. *B60Q 9/00* (2013.01); *B60R 11/04* (2013.01); *B60W 40/08* (2013.01); *G08B 21/0205* (2013.01); *H04W 4/40* (2018.02); *B60W 2040/0881* (2013.01)

(58) Field of Classification Search
CPC .......... B60Q 9/00; H04W 4/40; B60W 40/08; B60W 2040/0881; G08B 21/0205; B60R 11/04

See application file for complete search history.

(56) References Cited

U.S. PATENT DOCUMENTS

| 7,009,522 B2 * | 3/2006 | Flanagan ................ B60R 99/00 |
| | | 177/136 |
| 2008/0001730 A1 * | 1/2008 | Barton ................... B60N 2/002 |
| | | 340/457 |

FOREIGN PATENT DOCUMENTS

JP 2012188035 A 10/2012

* cited by examiner

*Primary Examiner* — Quan-Zhen Wang
*Assistant Examiner* — Rajsheed O Black-Childress
(74) *Attorney, Agent, or Firm* — Osha Bergman Watanabe & Burton LLP

(57) ABSTRACT

A vehicle control system includes: a vehicle control device that is mounted on a vehicle a portable device that is carried by a user and performs wireless communication with the vehicle control device; and a living body sensor that detects presence of a living body in a vehicle interior of the vehicle. The vehicle control device includes: an in-vehicle transmission unit that transmits a response request signal to the portable device; an in-vehicle reception unit that receives a response signal returned from the portable device in response to the response request signal; and a notification control unit that does not perform notification to the vehicle interior or an outside of the vehicle when the living body sensor detects that the living body is present in the vehicle interior and the in-vehicle reception unit receives the response signal.

2 Claims, 4 Drawing Sheets

VEHICLE CONTROL SYSTEM AND VEHICLE CONTROL DEVICE

CROSS-REFERENCES TO RELATED APPLICATIONS

This application is based upon and claims the benefit of priority from Japanese Patent Application No. 2019-046335, filed on Mar. 13, 2019; the entire contents of which are incorporated herein by reference.

FIELD

One or more embodiments of the present invention relate to a vehicle control system for controlling an operation of an in-vehicle device mounted on a vehicle based on wireless communication between a vehicle control device mounted on the vehicle and a portable device carried by a user.

BACKGROUND

In recent years, an accident in which a guardian leaves an infant behind in a vehicle and causes death has become a social problem, and a system for detecting the leaving of an infant behind in a vehicle interior has begun to be installed. Basically, when the presence or absence of an infant in a vehicle interior is detected and it is determined that the infant is present in the vehicle interior, an alarm such as a horn, a hazard, or the like is issued to the outside of the vehicle or the guardian is notified to a smart phone or the like by using an operation of the guardian of leaving the vehicle interior as a trigger. For example, JP-A-2012-188035 discloses a leaving child behind alarm device that issues an alarm only when a child seat is attached to a vehicle and a child may be left behind in a vehicle interior.

SUMMARY

However, when considering a scene of a guardian with a child getting on a vehicle, in the related art as described above, first, at the time of getting on the vehicle (before an engine is started), when a child seat is attached to a rear seat, and the child is placed, a door is opened and closed, there is a problem in that it is detected that the child has been left behind even when the guardian is about to get on from now on the vehicle, an unnecessary alarm is issued, and the guardian gets annoyed. If the alarm is turned off to avoid this inconvenience in some cases, it is conceivable that the original function does not operate when necessary, which is a totally overturned state.

One or more embodiments of the present invention have been made in view of the above-mentioned problems, and an object thereof is to suppress unnecessary notifications from being triggered.

In one or more embodiments of the present invention, a vehicle control system includes: a vehicle control device that is mounted on a vehicle; a portable device that is carried by a user and performs wireless communication with the vehicle control device; and a living body sensor that detects presence of a living body in a vehicle interior of the vehicle, in which the vehicle control device includes an in-vehicle transmission unit that transmits a response request signal to the portable device, an in-vehicle reception unit that receives a response signal returned from the portable device in response to the response request signal, and a notification control unit that does not perform notification to the vehicle interior or an outside of the vehicle when the living body sensor detects that the living body is present in the vehicle interior and the in-vehicle reception unit receives the response signal.

In one or more embodiments of the present invention, a vehicle control device is a vehicle control mountable on a vehicle including: an in-vehicle transmission unit that transmits a response request signal to a portable device that is carried by a user and performs wireless communication with the vehicle control device; an in-vehicle reception unit that receives a response signal returned from the portable device in response to the response request signal; and a notification control unit that does not perform notification to a vehicle interior or an outside of the vehicle when a living body sensor that detects presence of a living body in the vehicle interior of the vehicle detects that the living body is present in the vehicle interior and the in-vehicle reception unit receives the response signal.

In one or more embodiments of the present invention, a vehicle control system include: a vehicle control device mounted on a vehicle; a getting-on intention estimation unit that estimates whether a user of the vehicle has an intention to get on the vehicle; and a living body sensor that detects presence of a living body in a vehicle interior of the vehicle; and a notification control unit that does not perform notification to a vehicle interior or an outside of the vehicle when the living body sensor detects that the living body is present in the vehicle interior and the getting-on intention estimation unit estimates that the user has an intention to get on the vehicle.

According to one or more embodiments of the present invention, it is possible to suppress unnecessary notifications from being triggered.

DETAILED DESCRIPTION

Figure 1A:
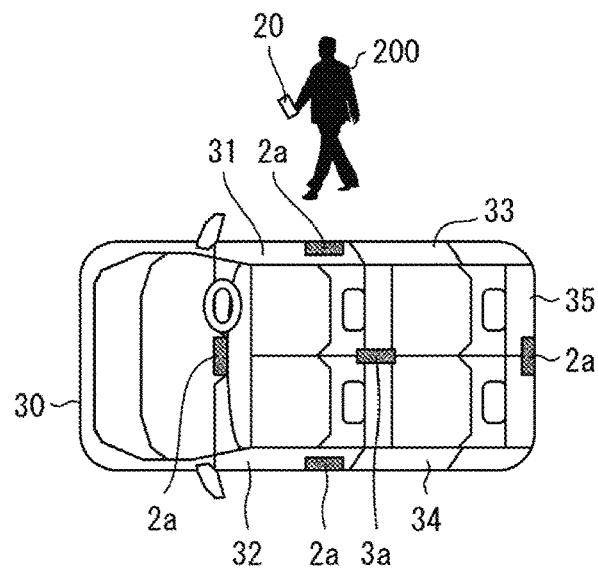
FIG. 1A and FIG. 1B are diagrams showing a vehicle and a portable device included in a vehicle control system according to one embodiment of the present invention.

In embodiments of the invention, numerous specific details are set forth in order to provide a thorough understanding of the invention. However, it will be apparent to one of ordinary skill in the art that the invention may be practiced without these specific details. In other instances, well-known features have not been described in detail to avoid obscuring the invention.

Hereinafter, one or more embodiments of the present invention will be described in detail. For convenience of description, members having the same functions as those of the members described above are denoted by the same reference numerals, and description thereof may be omitted.

(Outline of Vehicle and the Like)

Figure 1B:
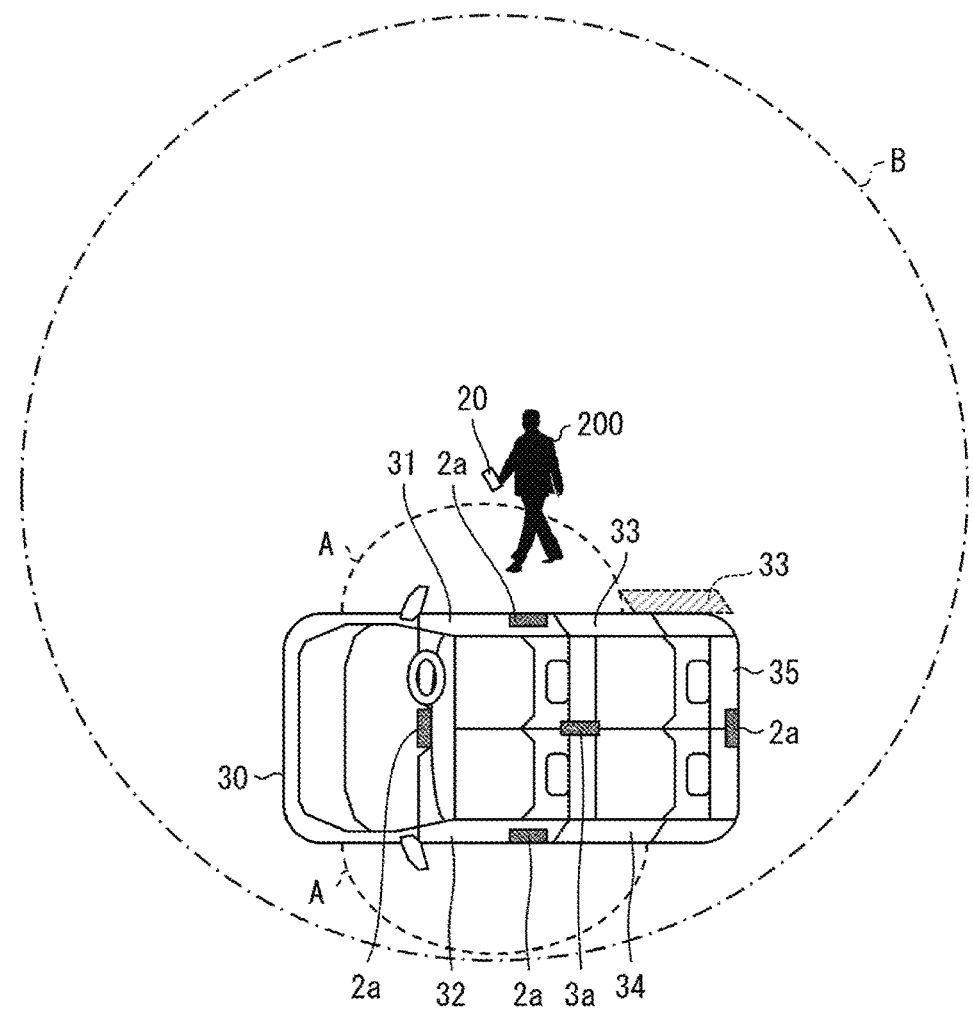

First, an outline of a vehicle 30 and the like will be described with reference to FIG. 1A and FIG. 1B. FIG. 1A and FIG. 1B are diagrams showing the vehicle 30 included in a vehicle control system 100, which will be described later, and a portable device 20.

As shown in FIG. 1A and FIG. 1B, the vehicle 30 is composed of a four-wheeled vehicle. The vehicle 30 is provided with a plurality of doors 31 to 35. Among the doors, the door 31 of the driver's seat of the vehicle 30, the door 32 of the passenger's seat, the door 33 of the right rear seat, the door 34 of the left rear seat, and the back door 35 of the rear surface of the vehicle 30 can be automatically locked and unlocked by a door lock device 11 of FIG. 2.

Figure 2:
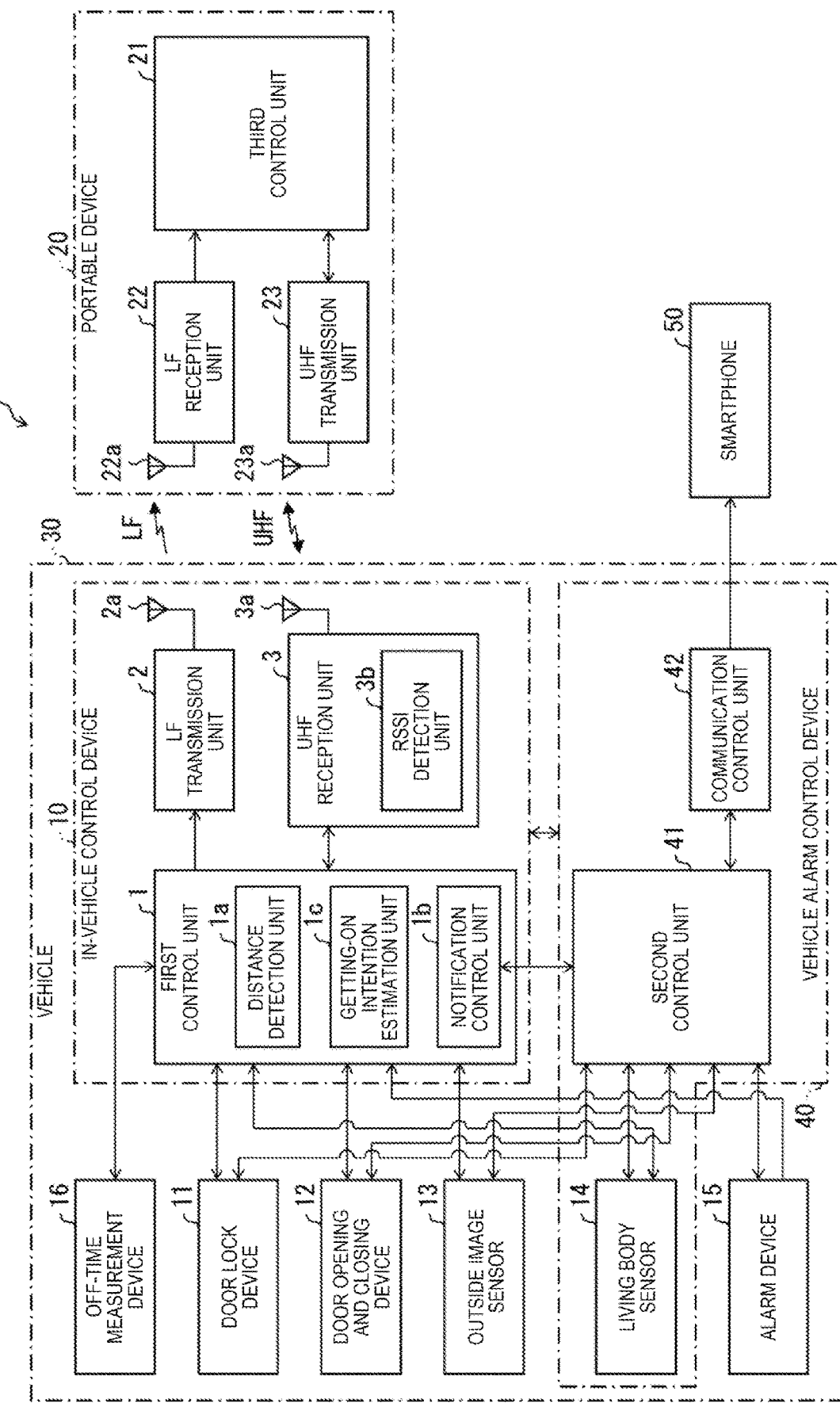
FIG. 2 is a configuration diagram of the vehicle control system according to one embodiment of the present invention.

The doors 33 and 34 of the right and left rear seats are power sliding doors which can be automatically opened and closed by a door opening and closing device 12 of FIG. 2 (see the door 33 indicated by the broken line in FIG. 1B). Hereinafter, the power sliding door is referred to as "PSD". The PSDs 33 and 34 of the right and left rear seats may be doors of hinge mechanisms. In this case, the vehicle 30 does not need the door opening and closing device 12.

A living body (not shown) is present in the vehicle interior of the vehicle 30. Examples of the living body include infants, pets, and the elderly, and the like. The portable device 20 is carried by a user 200 of the vehicle 30. Examples of the user include a guardian of an infant, a pet owner, and a caregiver of an elderly person.

(Configuration of Vehicle Control System)

Next, the configuration of the vehicle control system 100 will be described with reference to FIGS. 1A, 1B and FIG. 2. FIG. 2 is a configuration diagram of the vehicle control system 100.

As shown in FIG. 2, the vehicle control system 100 includes an in-vehicle control device (vehicle control device) 10, the portable device 20, and a vehicle alarm control device (vehicle control device) 40. In the vehicle control system 100, the operation of the in-vehicle device mounted on the vehicle 30 is controlled based on the wireless communication performed by the in-vehicle control device 10 and the portable device 20, and the transmission and reception of various types of information performed by the in-vehicle control device 10 and the vehicle alarm control device 40. The in-vehicle control device 10 and the vehicle alarm control device 40 are examples of the "vehicle control device" of one or more embodiments of the present invention. The in-vehicle control device 10 and the vehicle alarm control device 40 may be separate bodies as in the present embodiment, or the vehicle control device of one or more embodiments of the present invention may be configured by integrating both devices.

The vehicle control system 100 (specifically, the vehicle alarm control device 40) performs wireless communication with a smartphone 50. The smartphone 50 is a multi-function mobile phone having functions of a personal computer, a personal digital assistant (PDA: portable information terminal), and the like. The smartphone 50 receives various types of information from the vehicle alarm control device 40, and displays various types of images corresponding to the received information on a display screen (not shown).

The vehicle control system 100 may perform wireless communication with a tablet terminal, a wristwatch-type wearable terminal, or the like. The components of the vehicle control system 100 may not include the smartphone 50. In other words, the vehicle control system 100 may include only the vehicle 30 and the portable device 20.

As shown in FIG. 2, the in-vehicle control device 10, the door lock device 11, the door opening and closing device 12, an outside image sensor 13, a living body sensor 14, an alarm device 15, an off-time measurement device 16, and the vehicle alarm control device 40 are mounted on the vehicle 30.

(Vehicle Control Device)

The in-vehicle control device 10 includes a first control unit 1, a low frequency (LF: long wave) transmission unit (in-vehicle transmission unit) 2, and an ultra high frequency (UHF: high frequency) reception unit (in-vehicle reception unit) 3. The first control unit 1 includes a central processing unit (CPU), a memory, and the like.

A plurality of LF transmission units 2 are installed in the vehicle 30 (only one LF transmission unit 2 is collectively shown in FIG. 2). The LF transmission unit 2 is composed of an LF transmission antenna 2a, a transmission signal processing unit (not shown), and the like. As shown in FIG. 1A and FIG. 1B, the LF transmission antennas 2a are installed on the right side surface, the left side surface, the rear surface, the vehicle interior, and the like of the vehicle 30.

The LF transmission unit 2 transmits the LF signal (LF band signal) generated by the transmission signal processing unit from the LF transmission antenna 2a to the portable device 20 outside the vehicle or in the vehicle interior. The LF signal transmitted by the LF transmission unit 2 includes a response request signal for requesting a response to the portable device 20. The LF transmission unit 2 is an example of the "in-vehicle transmission unit" of one or more embodiments of the present invention.

The UHF reception unit 3 includes a UHF reception antenna 3a, a reception signal processing unit (not shown), a received signal strength indicator (RSSI) detection unit 3b, and the like. The UHF reception unit 3 is installed, for example, in the vehicle interior of the vehicle 30. As shown in FIG. 1A and FIG. 1B, the UHF reception antennas 3a are installed on the ceilings of the vehicles 30.

The UHF reception unit 3 receives the UHF signal (UHF band signal) transmitted from the portable device 20 by the UHF reception antenna 3a and the reception signal processing unit. The UHF signal received by the UHF reception unit 3 includes a response signal described later. The UHF reception unit 3 is an example of the "in-vehicle reception unit" of one or more embodiments of the present invention.

The RSSI detection unit 3b of the UHF reception unit 3 detects the RSSI value (reception strength) of the UHF signal (response signal) received by the UHF reception antenna 3a and the reception signal processing unit. A distance detection unit 1a of the first control unit 1 detects the distance from the vehicle 30 to the portable device 20 based on the RSSI value detected by the RSSI detection unit 3b.

The first control unit 1 performs wireless communication with the portable device 20 via the LF transmission unit 2 and the UHF reception unit 3 and transmits and receives an LF signal, a UHF signal, and various types of information to and from the portable device 20. The first control unit 1 controls the door lock device 11, the door opening and closing device 12, the outside image sensor 13, the living body sensor 14, the alarm device 15, and the off-time measurement device 16 in an integrated manner.

The first control unit 1 includes a notification control unit 1b. When the presence of a living body in the vehicle interior is detected by the living body sensor 14 and the UHF reception unit 3 does not receive a response signal, the notification control unit 1b instructs a second control unit 41 of the vehicle alarm control device 40 to perform notification to the vehicle interior or an outside of the vehicle. That is, when the presence of a living body in the vehicle interior is detected and the UHF reception unit 3 does not receive a response signal from the portable device 20, the in-vehicle control device 10 performs predetermined notification. For this reason, notifications can be reliably triggered in a situation where there is a high possibility of a living body being left behind. Here, the predetermined notification is, for example, an alarm indicating that a living body has been left behind.

In the case of a vehicle without a smart entry, the living body sensor 14 detects that a living body is present in the vehicle interior, and if it is estimated by a getting-on intention estimation unit 1c to be described later that the user has an intention to get on the vehicle, the first control unit 1 may instruct the second control unit 41 of the vehicle alarm control device 40 to notify to the vehicle interior or the outside of the vehicle.

When the living body sensor 14 detects that a living body is present in the vehicle interior and the UHF reception unit 3 receives a response signal, the first control unit 1 instructs the second control unit 41 of the vehicle alarm control device 40 not to notify to the vehicle interior or the outside of the vehicle (or stops an instruction to the second control unit 41). That is, even if it is detected that a living body is present in the vehicle interior, the in-vehicle control device 10 does not perform the predetermined notification when the UHF reception unit 3 receives a response signal from the portable device 20. Thus, it is possible to suppress unnecessary notifications from being triggered. As a result, the power consumption of the vehicle 30 can be suppressed.

The first control unit 1 further includes the getting-on intention estimation unit 1c. The getting-on intention estimation unit 1c estimates whether the user intends to get on the vehicle. When it is estimated by the getting-on intention estimation unit 1c that the user has an intention to get on the vehicle, the LF transmission unit 2 of the in-vehicle control device 10 transmits a response request signal to the portable device 20. Accordingly, in a situation where the user has an intention to get on the vehicle 30 from now on and the possibility of a living body being left behind is low, it is possible to more reliably suppress unnecessary notifications from being triggered.

The first control unit 1 may determine whether or not the user is out of a predetermined area based on the distance from the vehicle 30 to the portable device 20 detected by the distance detection unit 1a. In this case, when it is determined that the user is out of the predetermined area, the getting-on intention estimation unit 1c may estimate that the user does not have an intention to get on the vehicle. When the user is not out of the predetermined area (when the user is in the predetermined area), the getting-on intention estimation unit 1c may estimate that the user has an intention to get on the vehicle.

(Variation of Getting-on Intention Estimation)
<For Vehicle with Smart Entry>

When it is detected that an engine has not been started (stopped) for a predetermined time before a door other than the driver's seat door 31 is closed, when it is detected that an IG power source is off for the predetermined time, or when it is detected that the portable device 20 is not in the predetermined area for the predetermined time, the getting-on intention estimation unit 1c may estimate that the user has an intention to get on the vehicle.

If a door is unlocked when the portable device 20 enters the predetermined area from outside the predetermined area, the getting-on intention estimation unit 1c may estimate that the user has an intention to get on the vehicle.

<For Vehicle without Smart Entry>

If a door is unlocked after it is detected that the engine has not been started (stopped) for a predetermined time before a door other than the driver's seat door 31 is closed, or after it is detected that the ignition power source is off for the predetermined time, the notification control unit 1b may instruct the second control unit 41 of the vehicle alarm control device 40 not to notify to the vehicle interior or outside of the vehicle.

When it is detected by the outside image sensor 13 that the user continues to stay in the vicinity of the vehicle 30 when a door other than the door 31 of the driver's seat is closed, the notification control unit 1b may instruct the second control unit 41 of the vehicle alarm control device 40 not to notify to the vehicle interior or outside of the vehicle.

When the outside image sensor 13 detects that the guardian approaches the vehicle 30, the notification control unit 1b may instruct the second control unit 41 of the vehicle alarm control device 40 not to notify to the vehicle interior or the outside of the vehicle.

On the other hand, when the above condition is not satisfied, the notification control unit 1b may instruct the second control unit 41 of the vehicle alarm control device 40 to notify to the vehicle interior or the outside of the vehicle.

Next, in FIG. 1B, a vehicle control system, an outside LF communication range A (predetermined area) surrounded by the broken line is a reaching range of the LF signals transmitted to the outside of the vehicle from the LF transmission antennas 2a provided on the left and right side surfaces and the rear surface of the vehicle 30, respectively. In FIG. 1B, a part of the broken line of the outside LF communication range A is omitted for convenience. As shown in FIG. 1B, when the portable device 20 enters the outside LF communication range A, the LF signal transmitted from the in-vehicle control device 10 can be received by the portable device 20. The reaching range (not shown) of the LF signals transmitted from the LF transmission antennas 2a provided in the interior of the vehicle 30 substantially extends to the inside of the vehicle 30.

In FIG. 1B, a UHF communication range B surrounded by the dashed line is a reaching range of the UHF signal transmitted from a UHF transmission antenna 23a provided in the portable device 20. In of FIG. 1B, a part of the dashed line of the UHF communication range B is omitted for convenience. As shown in FIG. 1B, when the UHF reception antenna 3a enters the UHF communication range B, the in-vehicle control device 10 can receive the UHF signal transmitted from the portable device 20.

As shown in FIG. 1B, the UHF communication range B is wider than the outside LF communication range A. That is, the reaching distance of the UHF signal is longer than the reaching distance of the LF signal.

As shown in FIG. 2, the door lock device 11, the door opening and closing device 12, the outside image sensor 13, the living body sensor 14, the alarm device 15, and the off-time measurement device 16 are connected to the in-vehicle control device 10, respectively.

The door lock device 11 includes a mechanism for locking and unlocking the doors 31 to 35 of the vehicle 30, and a drive circuit for the mechanism. The door opening and closing device 12 includes a mechanism for opening and closing the doors 33 and 34 of the vehicle 30, and a drive circuit for the mechanism.

The outside image sensor 13 is a sensor that captures an image of a predetermined area outside the vehicle. The getting-on intention estimation unit 1c described above may estimate that the user has an intention to get on the vehicle when the user is imaged in the predetermined area by the outside image sensor 13. When the user is imaged in the predetermined area by the outside image sensor 13, there is a high possibility that the user has an intention to get on the vehicle. For this reason, the getting-on intention estimation unit 1c can more accurately estimate that the user has an intention to get on the vehicle.

The living body sensor 14 is a sensor that detects the presence of a living body in the vehicle interior, and is a component of the vehicle alarm control device 40 described later. The living body sensor 14 is composed of, for example, a radio wave sensor. The radio wave sensor detects a living body by irradiating a living body with a radio wave and receiving a reflected wave from the living body. The living body sensor 14 detects the presence of a living body based on the presence of a periodic signal waveform peculiar to the living body from the received waveform of the reflected wave. The living body sensor 14 may detect a living body by detecting bio-information. Examples of the bio-information include a heartbeat rate, a respiration rate, a body motion, and a pulse rate.

In the vehicle alarm control device 40, the living body sensor 14 starts to detect a living body under the control of the second control unit 41 from the timing when the vehicle 30 stops. The detection start timing of the living body sensor 14 may be, for example, a timing at which the IG power source (not shown) is turned off, or a timing at which the first control unit 1 determines that the user 200 is out of the vehicle.

When detecting that a target living body is present in the vehicle interior, the second control unit 41 transmits a detection result to that effect to the first control unit 1 of the in-vehicle control device 10. The first control unit 1 that has received the detection result transmits an LF signal including a response request signal from the LF transmission unit 2 to the portable device 20 via the LF transmission antennas 2a. On the other hand, when it is not possible to detect the presence of the target living body in the vehicle interior, the second control unit 41 again detects the presence of the target living body in the vehicle interior.

When the LF signal is transmitted to the portable device 20, it means that the user 200 is staying in the vehicle interior or immediately after the user 200 goes out of the vehicle. In other words, as shown in FIG. 1B, the portable device 20 is present in the outside LF communication range A, and the UHF reception antennas 3a of the in-vehicle control device 10 is present in the UHF communication range B.

Therefore, an LF reception unit 22 of the portable device 20 receives an LF signal via an LF reception antenna 22a. Then, a third control unit 21 of the portable device 20 transmits a UHF signal including a response signal and an ID code from a UHF transmission unit 23 to the in-vehicle control device 10 via the UHF transmission antenna 23a. At this time, the RSSI value of the LF signal received by the LF reception unit 22 is put on the UHF signal transmitted from the UHF transmission unit 23.

In the in-vehicle control device 10, the UHF reception unit 3 receives a UHF signal via the UHF reception antennas 3a. Then, the RSSI detection unit 3b of the UHF reception unit 3 detects the RSSI value of the received UHF signal and transmits the signal to the first control unit 1. Next, the distance detection unit 1a of the first control unit 1 detects the distance from the vehicle 30 to the portable device 20 based on the RSSI value received from the RSSI detection unit 3b.

Next, the off-time measurement device 16 measures the time during which a traveling drive source (for example, engine or motor) or the ignition power source (IG power source) of the vehicle is off. The measurement of the time during which the IG power source is off by the off-time measurement device 16 may be started, for example, at the timing when the IG power source is off.

The getting-on intention estimation unit 1c described above may estimate that the user has an intention to get on the vehicle when it is detected that a door other than the door 31 of the driver's seat of the vehicle 30 has been opened and the time measured by the off-time measurement device 16 has elapsed a predetermined time or more. When the time during which the traveling drive source or the IG power source is off is relatively long (when the time is equal to or longer than a predetermined time), there is a high possibility that the user has an intention to get on the vehicle. Therefore, the getting-on intention estimation unit 1c can more accurately estimate that the user has an intention to get on the vehicle by appropriately setting the predetermined time.

The alarm device 15 is a device that outputs sounds such as a buzzer or a horn. The alarm device 15 outputs a predetermined alarm sound under the control of the second control unit 41, which will be described later. Here, the predetermined alarm sound may be an alarm sound for notifying that a living body has been left behind, for example.

<Portable Device>

The portable device 20 is composed of electronic keys. As shown in FIG. 2, the portable device 20 includes the third control unit 21, the LF reception unit 22, and the UHF transmission unit 23. Each of the units 21 to 23 of the portable device 20 is operated by electric power of a battery (not shown) incorporated in the portable device 20. The third control unit 21 includes a CPU, a memory, and the like.

The LF reception unit 22 includes the LF reception antenna 22a, a reception signal processing unit (not shown), and the like. The LF reception unit 22 receives the LF signal transmitted from the in-vehicle control device 10 by the LF reception antenna 22a and the reception signal processing unit. The LF signal received by the LF reception unit 22 includes a response request signal.

The UHF transmission unit 23 includes the UHF transmission antenna 23a, a transmission signal processing unit (not shown), and the like. The UHF transmission unit 23 transmits the UHF signal generated by the transmission signal processing unit from the UHF transmission antenna 23a to the in-vehicle control device 10. The UHF signal transmitted by the UHF transmission unit 23 includes a response signal.

The third control unit 21 performs wireless communication with the in-vehicle control device 10 via the LF reception unit 22 and the UHF transmission unit 23 and transmits and receives an LF signal, a UHF signal, and various types of information to and from the in-vehicle control device 10.

<Vehicle Alarm Control Device>

As shown in FIG. 2, the vehicle alarm control device 40 includes the living body sensor 14, the second control unit 41, and a communication control unit 42. The door lock device 11, the door opening and closing device 12, the outside image sensor 13, and the alarm device 15 are also connected to the vehicle alarm control device 40, respectively.

The second control unit 41 includes a CPU, a memory, and the like. The second control unit 41 is connected to the first control unit 1 and transmits and receives various types of information to and from the in-vehicle control device 10 (specifically, the first control unit 1).

The second control unit 41 controls the operation of the alarm device 15 according to whether or not the UHF reception unit 3 has received a response signal when the living body sensor 14 detects that the living body is present in the vehicle interior.

The communication control unit 42 performs wireless communication with, for example, a Wi-Fi (registered trademark) or the smartphone 50 and controls the transmission of various types of information from the vehicle alarm control device 40 to the smartphone 50. The communication control unit 42 and the smartphone 50 are wirelessly connected by Wi-Fi, telematics, or the like. The second control unit 41 controls the operation of the communication control unit 42 according to whether or not the UHF reception unit 3 has received a response signal when the living body sensor 14 detects that the living body is present in the vehicle interior. More specifically, when the UHF reception unit 3 receives a response signal, the communication control unit 42 does not send a predetermined notification to the smartphone 50. On the other hand, when the UHF reception unit 3 does not receive a response signal, the communication control unit 42 sends a predetermined notification to the smartphone 50. At this time, the smartphone 50 displays a notification image corresponding to the notification on a display screen. This notification image is, for example, an image notifying that a living body has been left behind.

(Control Method of Vehicle Control System)

Figure 3:
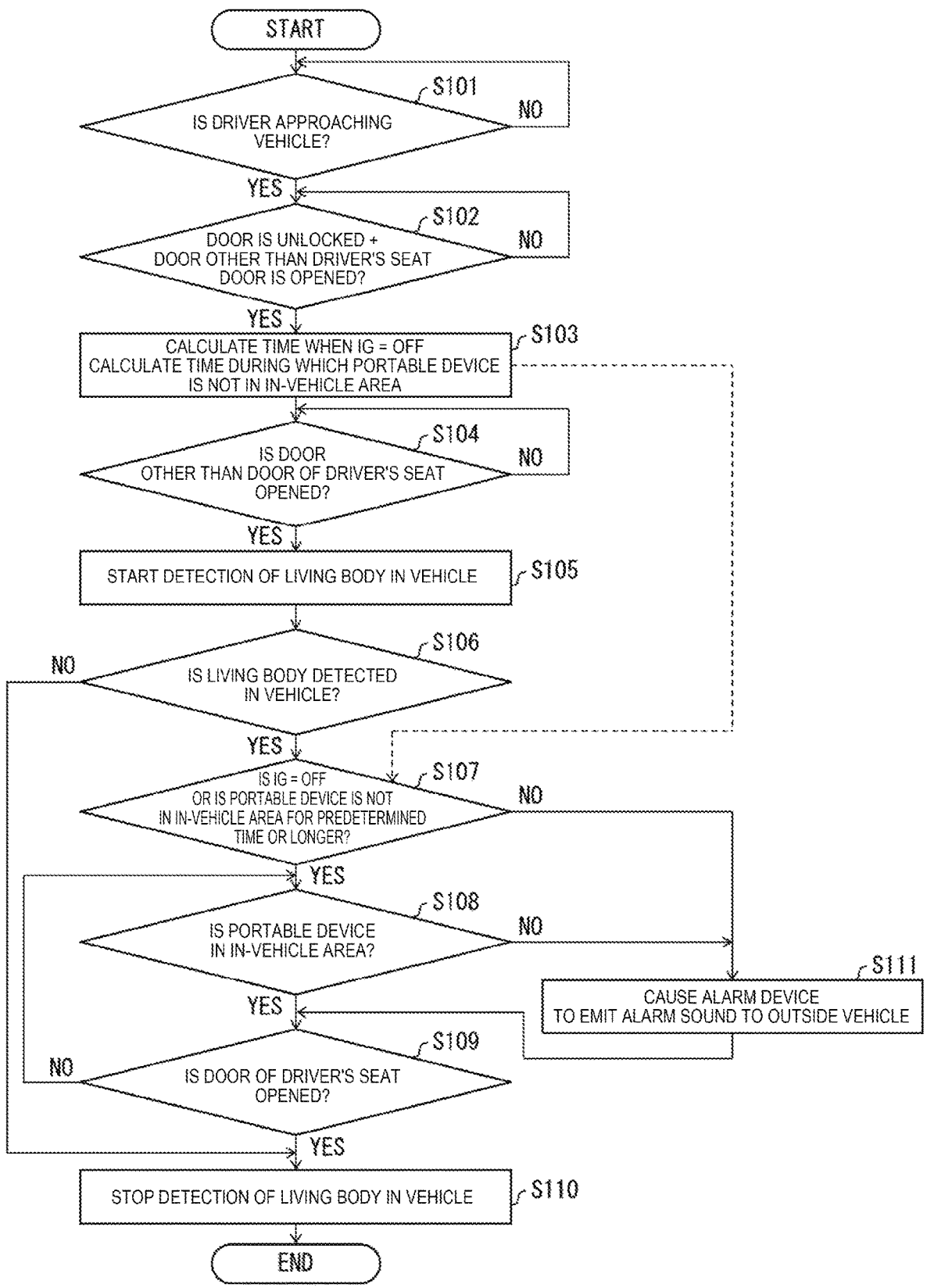
FIG. 3 is a flowchart showing an example of a control method of the vehicle control system.

The vehicle control system 100 is controlled by performing the following steps. FIG. 3 is a flowchart showing an example of a control method of the vehicle control system 100 (the case of a model with a smart entry) according to one embodiment of the present invention.

In step S101 (hereinafter, the "step" is omitted), the outside image sensor 13 detects whether or not a driver (user) approaches the vehicle 30. As a result, when the approach of the driver is detected (YES), the process proceeds to S102. On the other hand, when the approach of the driver is not detected (NO), the process returns to S101. The flow of S101 can be omitted.

When all the doors of the vehicle 30 are unlocked and it is detected that a door other than the door 31 of the driver's seat (abbreviated as a door other than the driver's seat in the drawing) is opened (YES), the process proceeds to S103. On the other hand, when it is not detected that a door other than the door 31 of the driver's seat is opened, the process returns to S102.

In S103, the off-time measurement device 16 starts the measurement of the time when IG=OFF. Alternatively, the first control unit 1 starts the measurement of the time during which the portable device 20 is not in the in-vehicle area, and the process proceeds to S104.

In S104, the first control unit 1 detects whether or not a door other than the door 31 of the driver's seat is closed. When it is detected that a door other than the door 31 of the driver's seat is closed (YES), the process proceeds to S105. On the other hand, when it is not detected that a door other than the door 31 of the driver's seat is closed (NO), the process returns to S104.

In S105, the living body sensor 14 starts the detection of a living body in the vehicle, and the process proceeds to S106. If it is detected in S106 that a living body is present in the vehicle interior (YES), the process proceeds to S107. On the other hand, when it is not detected that the living body is present in the vehicle interior (NO), the process proceeds to S110.

In S107, the first control unit 1 checks whether or not IG=OFF for a predetermined time or longer, or whether or not the portable device 20 is not in the in-vehicle area for a predetermined time or longer. As a result, if IG=OFF for the predetermined time or longer, or if the portable device 20 is not in the in-vehicle area for the predetermined time or longer (YES), the process proceeds to S108. On the other hand, if the time during which IG=OFF is less than the predetermined time, or if the time during which the portable device 20 is not in the in-vehicle area is less than the predetermined time (NO), the process proceeds to S111.

In S108, the first control unit 1 detects whether or not the portable device 20 is in the outside area of the vehicle. As a result, if the portable device 20 is in the outside area of the vehicle (YES), the process proceeds to S109. On the other hand, when the portable device 20 is not in the outside area of the vehicle (NO), the process proceeds to S111.

In S111, the second control unit 41 causes the alarm device 15 to emit an alarm sound. At this time, the second control unit 41 may cause the smartphone 50 to display an alarm image via the notification control unit 1*b*.

In S109, it is detected whether or not the door 31 of the driver's seat is opened. As a result, when the door 31 of the driver's seat is opened (YES), the process proceeds to S110. On the other hand, when the door 31 of the driver's seat is not opened (NO), the process proceeds to S108. In S110, the second control unit 41 stops an operation of detecting a living body in the vehicle by the living body sensor 14, and the process turns to "END".

Figure 4:
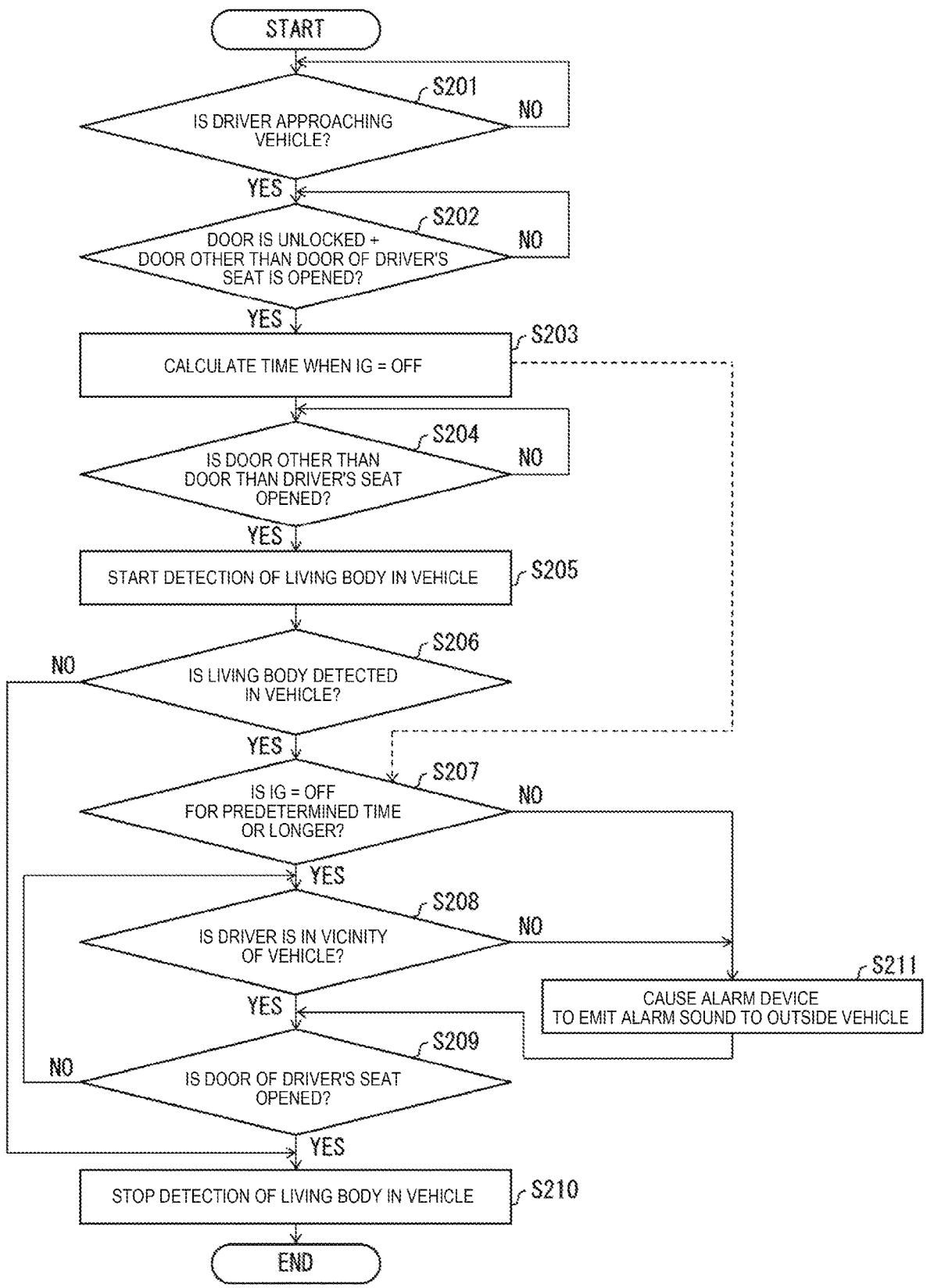
FIG. 4 is a flowchart showing an example of a control method of the vehicle control system.

Next, FIG. 4 is a flowchart illustrating an example of a control method of a vehicle control system in the case of a model without a smart entry.

Since the operation of S201 to S211 generally corresponds to S101 to S111 and the operation other than S203, S207, and S208 is the same as the flow of FIG. 3, only the operation of S203, S207, and S208 will be described here.

In S203, the off-time measurement device 16 starts the measurement of the time when IG=OFF, and the process proceeds to S204.

In S207, the first control unit 1 checks whether or not IG=OFF for the predetermined time or longer. As a result, if IG=OFF for the predetermined time or longer (YES), the process proceeds to S208. On the other hand, if the time when IG=OFF is less than the predetermined time (NO), the process proceeds to S211.

In S208, the outside image sensor 13 detects whether or not the driver (user) is in the vicinity of the vehicle 30. As a result, if the driver is in the vicinity of the vehicle 30 (YES), the process proceeds to S209. On the other hand, if the driver is not in the vicinity of the vehicle 30 (NO), the process proceeds to S211.

(Variation of Present Invention)

A plurality of variations are assumed for the vehicle control system 100, the in-vehicle control device 10, and the vehicle alarm control device 40 according to one embodiment of the present invention.

For example, after detecting vehicle interior information on the vehicle interior environment such as the temperature in the vehicle interior and the amount of carbon monoxide in the atmosphere in the vehicle interior, whether or not the environment in the vehicle interior is in a state dangerous to a living body may be added to the factors for determining when predetermined notification is performed.

As a specific process, a temperature sensor (not shown) mounted in the vehicle detects the temperature in the vehicle interior and transmits the detection result to the second control unit 41 of the vehicle alarm control device 40. A gas sensor (not shown) mounted in the vehicle detects the amount of carbon monoxide in the atmosphere in the vehicle interior and transmits the detection result to the second control unit 41. Examples of the gas sensor include a CO concentration sensor.

The second control unit 41 which has received these detection results as the vehicle interior information compares the temperature in the vehicle interior included in the vehicle interior information with a first threshold value and compares the amount of carbon monoxide included in the vehicle interior information with a second threshold value to determine whether or not the environment in the vehicle interior is in a state dangerous to a living body.

The first and second thresholds are thresholds used as a reference when determining whether or not the environment in the vehicle interior is dangerous to a living body, and can be set at random. The first and second thresholds are stored in, for example, the memory of the second control unit 41.

For example, the second control unit 41 may determine that the environment in the vehicle interior is in a state dangerous to a living body when at least one of the conditions, (1) the temperature in the vehicle interior is higher than the first threshold value and (2) the amount of carbon monoxide is higher than the second threshold value, is satisfied. For example, the second control unit 41 may determine that the environment in the vehicle interior is in a state dangerous to a living body when both the condition (1) and the condition (2) are satisfied, or at least when the condition (2) is satisfied.

Then, the second control unit 41 which has determined whether or not the environment in the vehicle interior is in a state dangerous to a living body adds the obtained determination result to the factors for determining when an alarm is issued with respect to the alarm device 15. That is, the second control unit 41 determines whether or not to issue an alarm with respect to the alarm device 15 based on the bio-information received from the living body sensor, the detection result relating to the operation of the user 200 getting off, and the determination results above.

As described above, the second control unit 41 determines whether or not the environment in the vehicle interior is in a state dangerous to a living body, thereby increasing the number of factors for determining when an alarm is issued. Therefore, it is possible to accurately notify that a living body has been left behind in the vehicle interior.

The technical idea of one or more embodiments of the present invention is also applicable to a vehicle having a keyless entry function. Hereinafter, a vehicle having a keyless entry function to which the technical idea of one or more embodiments of the present invention is applied is referred to as a "reference vehicle (not shown)". The in-vehicle control device 10 of the reference vehicle transmits and receives various signals to and from a keyless entry key (hereinafter, referred to as "remote controller") instead of the portable device 20.

The first control unit 1 of the in-vehicle control device 10 of the reference vehicle controls the execution of the keyless entry function of the reference vehicle by performing wireless communication with a remote controller. Specifically, the user 200 having a remote controller operates the buttons on the remote controller to lock and unlock and/or open and close all the doors in the reference vehicle. The second control unit 41 of the vehicle alarm control device 40 of the reference vehicle may perform wireless communication with the remote controller.

The first control unit 1 of the reference vehicle detects the unlock operation of all the doors of the reference vehicle by the user 200. Specifically, the first control unit 1 detects that some person has turned on the unlock switch of a door by a button operation based on information received from the door lock device 11. Further, the first control unit 1 may detect that the user 200 performs the button operation based on, for example, an image of the periphery of the door captured by the outside image sensor 13 mounted on the reference vehicle.

(Example of Software Implementation)

The control blocks (in particular, the LF transmission unit 2, the UHF reception unit 3, the notification control unit 1*b*, and the getting-on intention estimation unit 1*c*) of the in-vehicle control device 10 may be realized by a logic circuit (hardware) formed in an integrated circuit (IC chip) or the like, or may be realized by software.

In the latter case, the in-vehicle control device 10 includes a computer which executes instructions of a program which is software for realizing each function. The computer includes, for example, at least one processor (control device) and at least one computer-readable recording medium storing the program. In the computer, the object of one or more embodiments of the present invention is achieved by reading and executing the program from the recording medium by the processor. As the processor, for example, a CPU can be used. As the recording medium, a "non-transitory tangible medium" such as a read only memory (ROM), a tape, a disk, a card, a semiconductor memory, a programmable logic circuit, or the like can be used. A random access memory (RAM) for expanding the program may be further provided. The program may be supplied to the computer via a random transmission medium (a communication network, a broadcast wave, or the like) capable of transmitting the program. One or more embodiments of the invention can also be realized in the form of a data signal embedded in a carrier wave, in which the program is embodied by electronic transmission.

(Summary)

In accordance with a first aspect of the present invention, a vehicle control system (100) includes: a vehicle control device (in-vehicle control device 10 and in-vehicle alarm control device 40) that is mounted on a vehicle; a portable device (20) that is carried by a user and performs wireless communication with the vehicle control device; and a living body sensor (14) that detects presence of a living body in a vehicle interior of the vehicle, in which the vehicle control device includes an in-vehicle transmission unit (LF transmission unit 2) that transmits a response request signal to the portable device, an in-vehicle reception unit (UHF reception unit 3) that receives a response signal returned from the portable device in response to the response request signal, and a notification control unit (1*b*) that does not perform notification to the vehicle interior or an outside of the vehicle when the living body sensor detects that the living body is present in the vehicle interior and the in-vehicle reception unit receives the response signal.

With the above configuration, even if it is detected that the living body is present in the vehicle interior, notification is not performed when the in-vehicle reception unit receives the response signal from the portable device. Thus, it is possible to suppress unnecessary notifications from being triggered.

In the vehicle control system of a second aspect according to the first aspect of the present invention, it is preferable that the notification control unit (1*b*) performs notification to the vehicle interior or the outside of the vehicle when the living body sensor (14) detects that the living body is present in the vehicle interior and the in-vehicle reception unit (UHF reception unit 3) does not receive the response signal. According to the above configuration, when it is detected that the living body is present in the vehicle interior and the in-vehicle reception unit does not receive the response signal from the portable device, notification is performed. For this reason, notifications can be reliably triggered in a situation where there is a high possibility of a living body being left behind.

In the vehicle control system of a third aspect according to the first or second aspect of the present invention, the vehicle control device (in-vehicle control device 10 and vehicle alarm control device 40) may include a getting-on intention estimation unit (1c) that estimates whether the user has an intention to get on the vehicle, and the in-vehicle transmission unit (LF transmission unit 2) may transmit the response request signal to the portable device (20) when the getting-on intention estimation unit estimates that the user has an intention to get on the vehicle. With the above configuration, when it is estimated that the user has an intention to get on the vehicle, a response request signal is transmitted to the portable device. Therefore, in a situation where the user has an intention to get on the vehicle from now on and the possibility of the living body being left behind is low, it is possible to more reliably suppress unnecessary notifications from being triggered.

The vehicle control system of a fourth aspect according to the third aspect of the present invention further includes an off-time measurement device (16) that measures a time during which a traveling drive source or an ignition power source of the vehicle is off, in which the getting-on intention estimation unit may estimate that the user has an intention to get on the vehicle when it is detected that a door other than a door of a driver's seat of the vehicle has been opened and the time measured by the off-time measurement device has elapsed a predetermined time or longer. When the time during which the traveling drive source or the ignition power source is off is relatively long (when the time is equal to or longer than a predetermined time), there is a high possibility that the user has an intention to get on the vehicle. With the above configuration, it is possible to more accurately estimate that the user has an intention to get on the vehicle by appropriately setting the predetermined time.

In the vehicle control system of a fifth aspect according to the third aspect of the present invention, the vehicle control system (100) further includes an outside image sensor (13) that images a predetermined area outside the vehicle, in which the getting-on intention estimation unit (1c) may estimate that the user has an intention to get on the vehicle when the user is imaged within the predetermined area by the outside image sensor. When the user is imaged in the predetermined area by the outside image sensor, there is a high possibility that the user has an intention to get on the vehicle. With the above configuration, it is possible to more accurately estimate that the user has an intention to get on the vehicle.

In the vehicle control system of a sixth aspect according to any one of the first to fifth aspects of the present invention, the living body sensor (14) may detect the presence of the living body by irradiating the living body with a radio wave and receiving a reflected wave from the living body. With the above configuration, it is possible to detect the presence of a living body in the vehicle cabin detected using the radio wave.

The vehicle control device of a seventh aspect (in-vehicle control device 10 and vehicle alarm control device 40) according to the present invention is a vehicle control device mountable on a vehicle, including an in-vehicle transmission unit (LF transmission unit 2) that transmits a response request signal to a portable device (20) that is carried by a user and performs wireless communication with the vehicle control device; an in-vehicle reception unit (UHF reception unit 3) that receives a response signal returned from the portable device in response to the response request signal; and a notification control unit (1b) that does not perform notification to a vehicle interior or an outside of the vehicle when a living body sensor (14) that detects presence of a living body in the vehicle interior of the vehicle detects that the living body is present in the vehicle interior and the in-vehicle reception unit receives the response signal. With the above configuration, the same effect as that of the vehicle control system according to the first aspect can be obtained.

The vehicle control system of an eighth aspect according to the present invention includes: a vehicle control device mounted on a vehicle; a getting-on intention estimation unit that estimates whether a user of the vehicle has an intention to get on the vehicle; and a living body sensor that detects presence of a living body in a vehicle interior of the vehicle; and a notification control unit that does not perform notification to a vehicle interior or an outside of the vehicle when the living body sensor detects that the living body is present in the vehicle interior and the getting-on intention estimation unit estimates that the user has an intention to get on the vehicle. With the above configuration, the same effect as that of the vehicle control system according to the first aspect can be obtained.

ADDITIONAL NOTES

While the invention has been described with respect to a limited number of embodiments, those skilled in the art, having benefit of this disclosure, will appreciate that other embodiments can be devised which do not depart from the scope of the invention as disclosed herein. According, the scope of the invention should be limited only by the attached claims.

The invention claimed is:
1. A vehicle control system comprising:
a vehicle control device that is mounted on a vehicle;
a portable device that is carried by a user and performs wireless communication with the vehicle control device; and
a living body sensor that detects presence of a living body in a vehicle interior of the vehicle,
wherein the vehicle control device comprises:
an in-vehicle transmission unit that transmits a response request signal to the portable device;
an in-vehicle reception unit that receives a response signal returned from the portable device in response to the response request signal; and
a notification control unit that does not perform notification to the vehicle interior or an outside of the vehicle when the living body sensor detects that the living body is present in the vehicle interior and the in-vehicle reception unit receives the response signal,
wherein the vehicle control device comprises a getting-in intention estimation unit that estimates whether the user has an intention to get in the vehicle, and
wherein the in-vehicle transmission unit transmits the response request signal to the portable device when the getting-in intention estimation unit estimates that the user has an intention to get in the vehicle,
the vehicle control system further comprising:
an off-time measurement device that measures a time during which a traveling drive source or an ignition power source of the vehicle is off, wherein the getting-in intention estimation unit estimates that the user has an intention to get in the vehicle when it is detected that a door other than a door of a driver's seat of the vehicle has been opened and the time measured by the off-time measurement device has elapsed a predetermined time or longer.

2. A vehicle control system comprising:

a vehicle control device that is mounted on a vehicle;

a portable device that is carried by a user and performs wireless communication with the vehicle control device; and a living body sensor that detects presence of a living body in a vehicle interior of the vehicle, wherein the vehicle control device comprises:
   an in-vehicle transmission unit that transmits a response request signal to the portable device;
   an in-vehicle reception unit that receives a response signal returned from the portable device in response to the response request signal; and
   a notification control unit that does not perform notification to the vehicle interior or an outside of the vehicle when the living body sensor detects that the living body is present in the vehicle interior and the in-vehicle reception unit receives the response signal, wherein the vehicle control device comprises a getting-in intention estimation unit that estimates whether the user has an intention to get in the vehicle, and wherein the in-vehicle transmission unit transmits the response request signal to the portable device when the getting-in intention estimation unit estimates that the user has an intention to get in the vehicle, the vehicle control system further comprising:

an outside image sensor that captures an image of a predetermined area outside the vehicle, wherein the getting-in intention estimation unit estimates that the user has an intention to get in the vehicle when the user is imaged within the predetermined area by the outside image sensor.

\* \* \* \* \*